United States Patent [19]
Ahmadi

[11] Patent Number: 5,985,151
[45] Date of Patent: Nov. 16, 1999

[54] METHOD AND APPARATUS OF MEMBRANE SEPARATION

[75] Inventor: Saman Ahmadi, 17200 Westgrove Apt. 1616, Dallas, Tex. 76248

[73] Assignee: Saman Ahmadi, Dallas, Tex.

[21] Appl. No.: 08/994,918

[22] Filed: Dec. 19, 1997

[51] Int. Cl.$^6$ .............................. B01D 53/22; B01D 63/06
[52] U.S. Cl. ................................ 210/650; 95/45; 96/10; 210/321.74; 210/321.83
[58] Field of Search ...................... 95/43, 45–56; 96/4, 10; 210/644, 649–651, 321.6, 321.72, 321.73, 321.74, 321.78, 321.83, 321.87

[56] References Cited

U.S. PATENT DOCUMENTS

| | | | |
|---|---|---|---|
| 2,671,337 | 3/1954 | Hulsberg | 96/10 X |
| 3,289,846 | 12/1966 | Warrington et al. | 210/321.83 X |
| 3,545,931 | 12/1970 | McKinley, Jr. | 96/10 X |
| 3,662,520 | 5/1972 | Saunders | 96/10 |
| 3,665,680 | 5/1972 | Heuser | 96/10 |
| 3,782,904 | 1/1974 | Fletcher | 96/10 X |
| 3,915,802 | 10/1975 | Kominek | 210/321.83 X |
| 3,972,695 | 8/1976 | Buckley et al. | 96/10 |
| 3,983,194 | 9/1976 | Richardson et al. | 210/321.83 X |
| 4,056,373 | 11/1977 | Rubin | 96/10 |
| 4,430,098 | 2/1984 | Bowman et al. | 210/321.74 X |
| 4,500,430 | 2/1985 | Dasgupta | 210/321.72 X |
| 4,737,276 | 4/1988 | Adamich et al. | 210/321.83 X |
| 4,846,977 | 7/1989 | DeVellis et al. | 210/321.74 X |
| 4,902,416 | 2/1990 | Schroeder et al. | 210/321.83 X |
| 5,002,661 | 3/1991 | Chick et al. | 210/321.78 X |
| 5,340,384 | 8/1994 | Sims | 96/10 X |
| 5,442,968 | 8/1995 | Westlake, III et al. | 210/321.74 X |

*Primary Examiner*—Robert Spitzer
*Attorney, Agent, or Firm*—Markison & Reckamp, PC

[57] ABSTRACT

A method and apparatus for separation of substances using a membrane separation device includes a housing which is mechanically coupled to a substance inlet and a permeate outlet. The housing also supports a membrane filter that includes a tubular structure that is at least partially porous and is constructed in a helical-type shape. The membrane separation device separates substances by receiving a mixture of substances at the substance inlet and passing the substance to the membrane filter. Due to the helical-type shape, centrifugal force aids in the separation process, by mining fouling, and does so in a relatively small space while maximizing the specific membrane area.

14 Claims, 3 Drawing Sheets

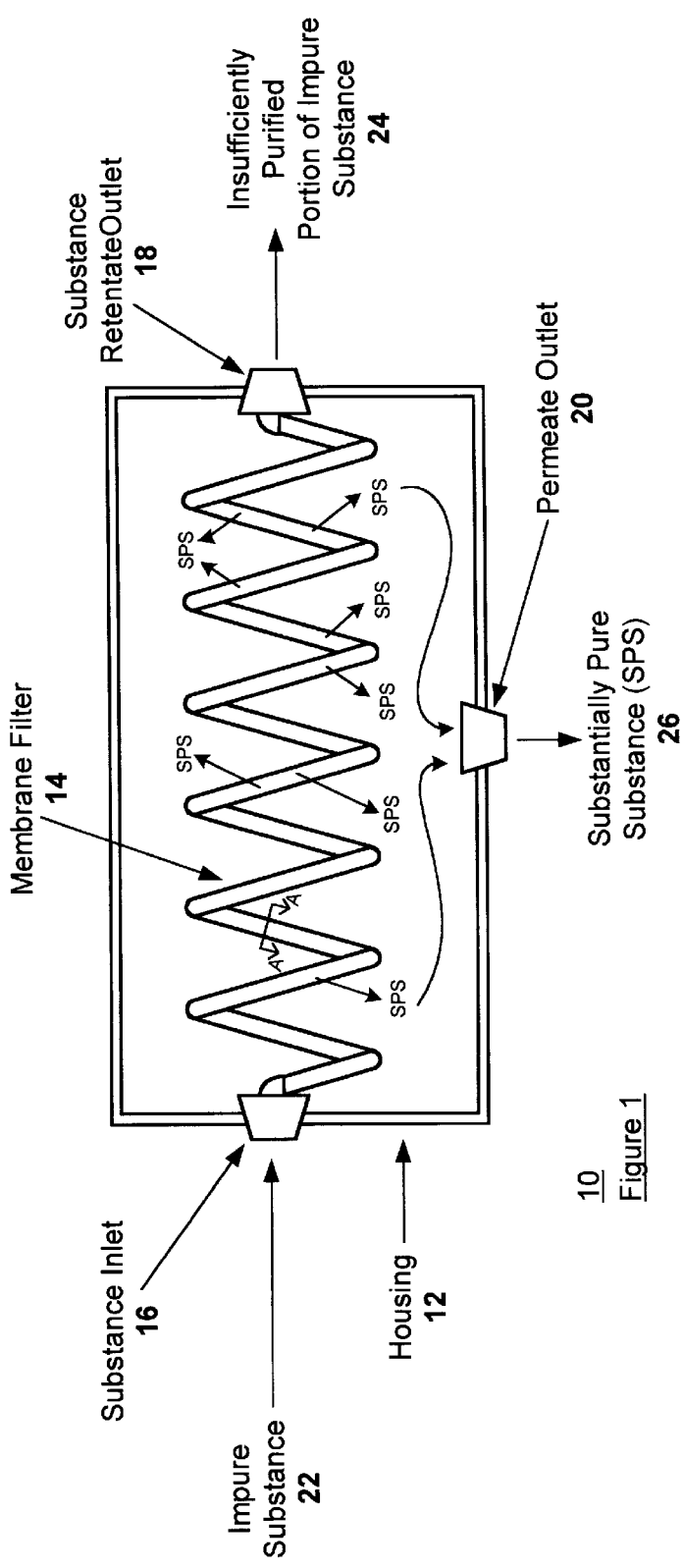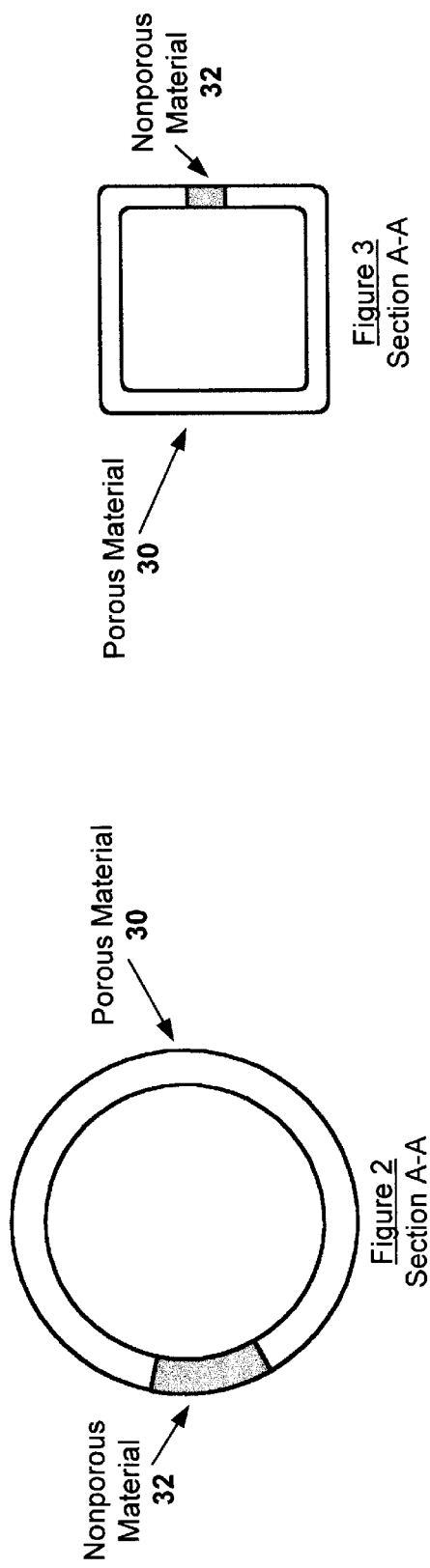

40

METHOD AND APPARATUS OF MEMBRANE SEPARATION

TECHNICAL FIELD OF THE INVENTION

This invention relates generally to substance purification using membrane separation and more particularly to a membrane separation method and apparatus that employs a membrane filter having helical-type shape.

BACKGROUND OF THE INVENTION

Liquid and gas separation processes are well known in the art. Most common separation processes involve a phase change, which increases the cost of the processes. Membrane separations, however, can achieve desired levels of separation without a change in the substances' phase. In essence, membrane separation selectively forces one or more substances through pores of a filter, leaving one or more larger substances behind. This is repeated until a satisfactory level of separation is achieved.

As is also known in the art, a satisfactory level of separation depends on the nature of the substances involved. For example, the purification of water has very strict governmental requirements to insure that public safety hazards are avoided. Industrial wastewaters must meet standards for a host of chemicals and compounds, including heavy metals and organics, before being allowed to enter public sanitary sewer systems.

Because of the increased popularity of membrane separation, there are a plurality of devices currently being used. For example, spiral wound membrane devices, sheet membrane devices, and straight tube membrane devices are all currently being used to achieve membrane separation. A spiral membrane device is constructed using a flat sheet of polymeric membrane, which, together with a mesh-type spacer is rolled around a perforated hollow tube. The liquid, therefore, must pass through several layers of membrane material before entering the perforated tube and exiting the separation device.

While the spiral membrane devices work well for some applications, they do have some limitations, such as susceptibility to fouling and, to a lesser degree, to extremes of temperature and pressure. Fouling is basically the clogging of the membrane over the duration of its use. Although the mesh-type spacer that is utilized reduces fouling, it can not totally eliminate this problem. Further, one method of restoring the integrity of the membrane is to apply a solution with either a high or low pH. This practice, due to its inherent corrosivity, reduces the life of the membrane.

Simliarly, sheet membrane devices work well in some applications, but have limitations, such as low membrane area and time consuming maintenance. Due to the size of these devices, it is difficult to provide the same membrane area as other membrane configurations. For example, a series of large flat sheets consume a larger space than a spiral wound membrane. Further, the cleaning and changing of the system involve disassembly of a large number of components.

Straight tube membrane devices work well in some applications, but have limitations, such as low membrane area and, to a lesser degree, fouling. In this configuration several long straight tubes, often made from ceramic materials, are housed in a large pipe. The materials used can usually withstand wider temperature and pH ranges but their shape and orientation does not allow for a large membrane area. There have been recent innovations which have attempted to increase the membrane area of the ceramic type of this class of devices; using one piece of straight ceramic tube and constructing numerous small "tubes" which run along its length. However, the performance of this configuration is limited by the pronounced fouling resulting from the small size of the "tubes".

Therefore, a need exists for a membrane separation method and apparatus that can withstand extremes in temperature and in pH, reduce the effect of fouling, while minimizing spatial requirements and maximizing specific membrane area.

BRIEF DESCRIPTION OF THE DRAWINGS

FIG. 1 illustrates a mechanical block diagram of a membrane separation device in accordance with the present invention;

FIG. 2 illustrates a cross-sectional view of the membrane filter of the device in FIG. 1;

FIG. 3 illustrates an alternate cross-sectional view of the membrane filter of the device in FIG. 1;

DETAILED DESCRIPTION OF THE DRAWINGS

Figure 4:
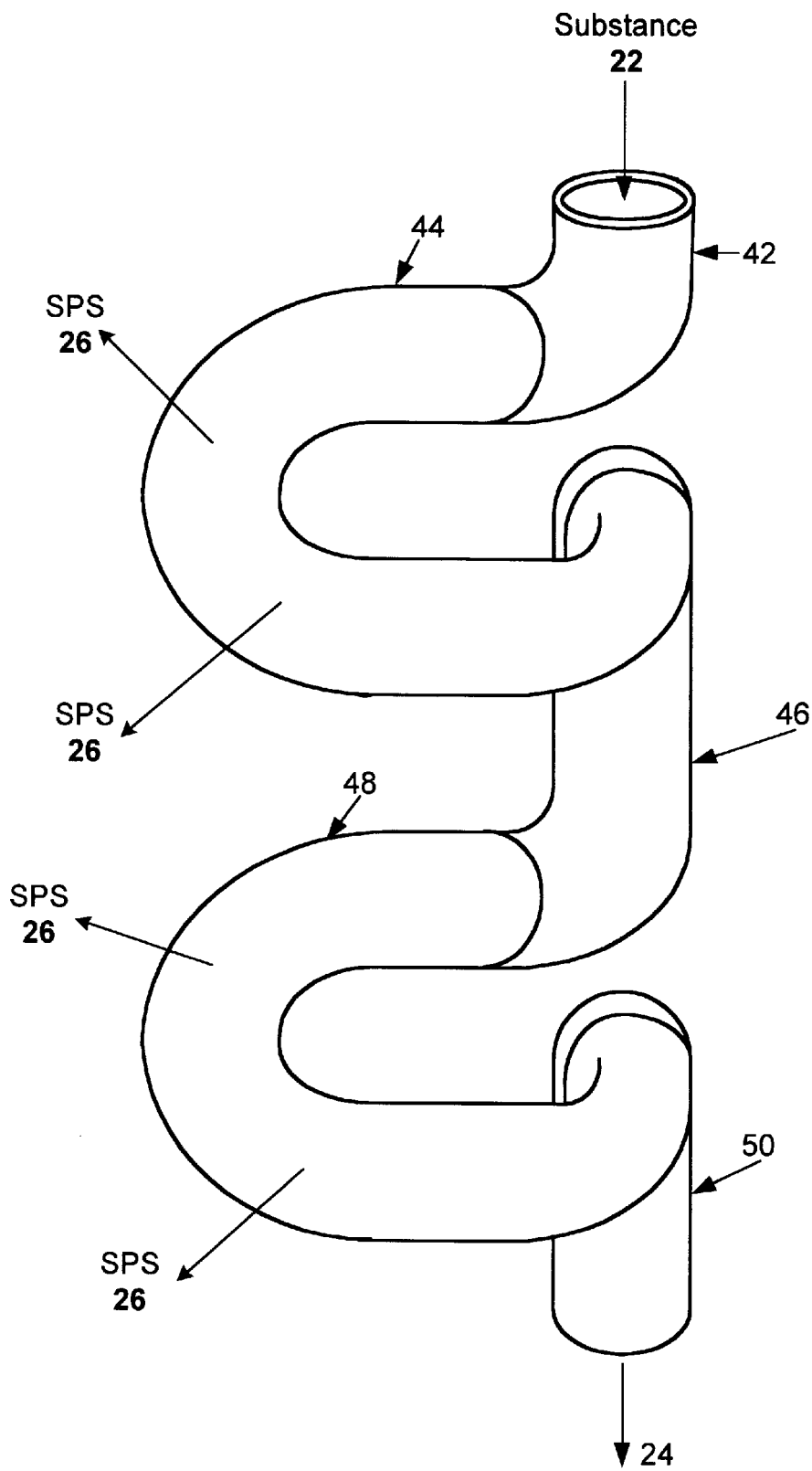
FIG. 4 illustrates mechanical coupling of tubular elements of the membrane filter in accordance with the present invention.

Generally, the present invention provides a method and apparatus for separating substances using a membrane separation device. The membrane separation device includes a housing which is mechanically coupled to a substance inlet and a permeate outlet. The housing also supports a membrane filter that includes a tubular structure that is at least partially porous and is constructed in a helical-type shape. The membrane separation device separates two or more substances by receiving the mixture of substances at the substance inlet and passing the substance to the membrane filter. Due to the helical-type shape, centrifugal force aids in the separation process and does so in a relatively small area. Thus, with such a method and apparatus, membrane separation devices can be developed to withstand extremes in temperature and pH, reduce the effect of fouling, as well as being developed to take up as minimal space as possible while providing for a relatively high specific membrane area.

The present invention can be more fully described with reference to FIGS. 1–5. FIG. 1 illustrates a membrane separation device 10 that includes a housing 12, a membrane filter 14, a substance inlet 16, a substance retentate outlet 18, and a permeate outlet 20. The housing 12 may be composed on any material that withstands the temperature and pH requirements of the purification process. For example, the housing 12 may be constructed of plastic, ceramic, metal, or a combination thereof.

The substance inlet 16 and the outlets 18 and 20 control the flow rate and the pressure within the membrane filter 14. To achieve this, the inlet 16 and outlets 18 and 20 may be simple tubes coupled to the membrane filter 14 and the housing 12 having different sizes or may be controllable by valves to regulate the flow rate and pressure.

The membrane tube 14 is constructed of a tubular structure having a porous material such as, ceramics, steel, and appropriate polymeric materials. The advantage of these materials is that they can withstand extremes of temperature and pH and can therefore be used in a variety of applications for longer periods of time. Variations of the tubular structure cross-section will be discussed below with reference to FIGS. 2 and 3.

As shown, the membrane tube 14 has a helical-type shape which may take the form of a coil, inter-connecting rings, inter-connecting polygons, or any other inter-coupling of tubular elements. As the mixture of substance 22 encounters the helical shape, the induced centrifugal force pushes the larger constituents to a selected region of the wall of the tube; this region is determined by the fluid dynamics of the process. If, as has been suggested, a non-stick, non-porous area is provided in the region to which the larger constituents are pushed, fouling will be minimized. This is achieved by the fact that the larger constituents, which are responsible for fouling, are kept away from the "effective" membrane surface and also have a non-stick, non-porous path on which to travel and exit the system as impure substance 24.

The membrane tube 14 may also include a non-porous section to reduce fouling. This region could be constructed from steel, or Teflon-coated steel, or Teflon-coated ceramics. If steel is utilized, it could also act as a "backbone" of the membrane filter and add to its structural integrity.

Regardless of the materials used and the exact geometric configuration, the membrane separation device 10 separates substances in liquids or gases. For example, if the mixture of substances is orange juice, the membrane separation device 10 separates the water from the mixture by accepting the mixture at inlet 16 as it is pumped in through tube 22. Control valves (not shown) may be adjusted to apply a membrane pressure across the membrane 14. The helical shape of membrane 14 induces a centrifugal force that forces the pulp and sugars and other substances to the non-porous, non-stick region. The trans-membrane pressure forces the water through membrane 14 into housing 12 and pure water exists the housing 12 through permeate outlet 26. An impure mixture substance 24 exists the housing 12 via outlet 18 and may be refiltered by providing the impure substance back to inlet 16. The process is repeated until the orange juice is concentrated to an acceptable level.

FIG. 2 illustrates a cross-sectional view of the tubular structure of the membrane filter 14. As shown, the cross-section is a circular shape having a porous material section 30 and a non-porous material section 32, which helps to reduce the effects of fouling.

FIG. 3 illustrates a cross-sectional view of the tubular structure of the membrane filter 14. As shown, the cross-section is a rectangular shape having a porous material section 30 and a non-porous material section 32. The non-porous material 32 aids in the reduction of the effects of fouling. As one skilled in the art will readily appreciate, the cross-section of the tubular structure may be of any geometric shape that permits a substance to flow through it.

FIG. 4 illustrates an interconnecting ring assembly 40 of the membrane filter 14. As shown, the ring assembly 40 includes a plurality of rings 44, 48, a plurality of interconnections 46, an inlet connection 42, and an outlet connection 50. These components can be made from a combination of steel and rubber parts to maximize chemical and temperature resistance and minimize the possibility of leaking.

Figure 5:
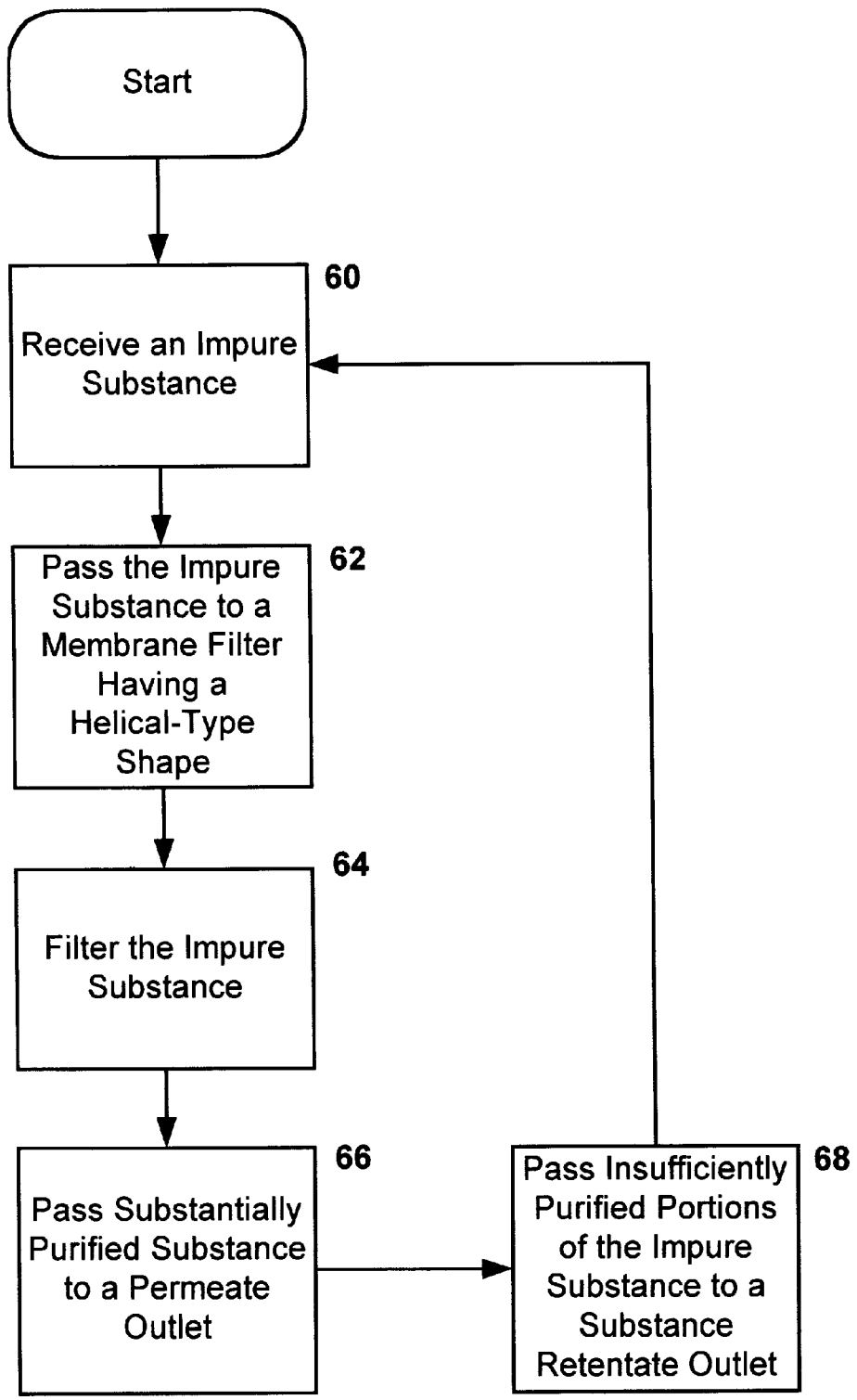
FIG. 5 illustrates a logic diagram that may be used to purify a substance in accordance with the present invention.

FIG. 5 illustrates a logic diagram that may be used to purify an impure substance and/or to collect a concentration of substances. The process begins at step 60 where the mixture enters the system and trans-membrane pressure is applied. The process then proceeds to step 62 where some of the smaller constituents pass through the membrane and exit the system. This is called the permeate. The larger constituents and remaining smaller constituents, the retentate, travel inside the membrane and return to step 60.

Alternatively, after step 62, the process may proceed to step 64 where the impure substance is filtered. The process then proceeds to steps 66 and 68. At step 66, the substantially purified substance is passed to a permeate outlet. At step 68, insufficiently purified portions of the impure substance is passed to a retentate outlet and the process repeats at step 60. The process is then repeated.

Following the orange juice concentration example, the original mixture of fresh orange juice is processed through the membrane filter until the desired volume of orange juice concentrate is reached.

As one skilled in the art will readily appreciate, there is a plurality of ways to implement the helical-type shape of the present invention without deviating from the spirit of the invention. For such an invention provides a membrane separation device and method that can withstand extremes in pH and temperatures within a minimal amount of space while maxing specific membrane area.

I claim:

1. A method for filtering an impure substance, the method comprising the steps of:

receiving the impure substance via a substance inlet;

passing the impure substance from the substance inlet to a membrane filter that includes a tubular structure that includes a non-porous section provided in a region of the membrane filter in which larger constituents of the impure substance are pushed due to a centrifugal force and is constructed in a helical shape; and filtering, by the membrane filter, the impure substance to produce a substantially purified substance, wherein the tubular structure reduces fouling within the membrane filter.

2. The method of claim 1 further comprises passing the substantially purified substance to a permeate outlet.

3. The method of claim 1 further comprises passing insufficiently purified portion of the impure substance to a substance retentate outlet.

4. The method of claim 3 further comprises passing the insufficiently purified portion of the impure substance from the substance retentate outlet to the substance inlet for further filtering.

5. A membrane separation device comprising:

a substance inlet;

a permeate outlet;

a housing mechanically coupled to the substance inlet and the permeate outlet; and a membrane filter mechanically located within the housing and mechanically coupled to the substance inlet, wherein the membrane filter includes a tubular structure that is constructed in a helical shape, wherein the membrane filter includes a non-porous section provided in a region of the membrane filter in which larger constituents of an impure substance are pushed due to a centrifugal force wherein the impure substance is received at the substance inlet, is at least partially filtered by the membrane filter, and a substantially pure substance is withdrawn from the permeate outlet.

6. The membrane separation device of claim 5, wherein the tubular structure of the membrane filter is comprised of at least one of: ceramic, porous steel, and porous polymer.

7. The membrane separation device of claim 5, wherein the helical shape of the tubular structure is one of: a helix, inter-connected rings, or inter-connected polygons.

8. The membrane separation device of claim 5, wherein the tubular structure comprises a construction of: a single molded structure, a single machined structure, or a mechanical coupling of a plurality of interconnecting tubular elements.

9. The membrane separation device of claim 5, wherein the non-porous section comprises at least one of: steel and Teflon.

10. The membrane separation device of claim 5, wherein the impure substance comprises at least one of: liquid and gas.

11. The membrane separation device of claim 5, wherein the tubular structure comprises a cross-sectional shape of: a circle, a square, a rectangular, or combination thereof.

12. A membrane separation device comprising:

a substance inlet;

a permeate outlet;

a membrane filter mechanically coupled to receive an impure substance from the substance inlet and mechanically coupled to provide a substantially purified rendering of the impure substance to the permeate outlet, wherein the membrane filter includes a tubular structure that is constructed in a helical shape, and wherein the membrane filter includes a non-porous section provided in a region of the membrane filter in which larger constituents of the impure substance are pushed due to a centrifugal force.

13. The membrane separation device of claim 12 further comprises a substance retentate outlet mechanically coupled to the membrane filter to receive insufficiently filtered portions of the impure substance.

14. The membrane separation device of claim 13 further comprises refiltering means for coupling the substance retentate outlet to the substance inlet such that the insufficiently filtered portions of the impure substance may be refiltered.

* * * * *